UNITED STATES PATENT OFFICE.

NATHAN GRÜNSTEIN, OF FRANKFORT-ON-THE-MAIN, GERMANY, ASSIGNOR TO THE FIRM OF CHEMISCHE FABRIK GRIESHEIM-ELEKTRON, OF FRANKFORT-ON-THE-MAIN, GERMANY, A CORPORATION OF GERMANY.

METHOD OF REGENERATING MERCURY CATALYSTS.

1,185,500.   Specification of Letters Patent.   Patented May 30, 1916.

No Drawing. Original application filed August 4, 1915, Serial No. 43,667. Divided and this application filed January 4, 1916. Serial No. 70,321.

*To all whom it may concern:*

Be it known that I, NATHAN GRÜNSTEIN, a subject of the Emperor of Russia, and resident of Frankfort-on-the-Main, Germany, have invented certain new and useful Improvements in the Method of Regenerating Mercury Catalysts, of which the following is a specification.

My invention relates to mercury catalysts and its particular object is a method for regenerating such catalysts when they are exhausted.

In certain processes such as the production of acetic aldehyde by introducing acetylene into acid solutions containing a mercury salt this latter is gradually reduced and becomes ineffective. However the mercury catalysts are not always converted into liquid metallic mercury; besides the liquid mercury more or less of a mercury sludge is formed which can be regenerated only with great difficulty. I have now ascertained that it is easy to regenerate such exhausted mercury catalysts by reducing the mercury sludge first of all into the metallic state and then converting the metal into compounds suitable for use as catalysts. In an earlier application, Serial Number 43,667, filed August 4, 1915, of which the present case is a division, I have described and claimed one method of regenerating such mercury catalysts.

In the practice of my invention as hereinafter described I regenerate the exhauted mercury catalysts by subjecting the mercury sludge in alkaline solution to the action of the electric current. By this treatment the sludge is transformed without any losses into liquid mercury which may then be converted, either by electrolysis or by any other means, into the catalytic active compounds.

Example I: 200 parts of a mercury sludge obtained by producing aldehyde from acetylene in sulfuric acid solution are freed from the impurities by washing; 400 parts of a 10 per cent. solution of caustic soda are then added and the mixture is subjected under continuous stirring to electrolysis at 40 to 60 degr. C. and to 3 to 6 volt. Iron electrodes are preferably employed. While the solution is foaming the mercury sludge is completely converted into liquid metallic mercury. It is merely necessary to provide for the addition of fresh sludge, which may be fed in either intermittently or continuously. The pure liquid mercury obtained can be transformed, either by electrolysis or in any other way, into mercurous or mercuric compounds which may then be used again as catalysts. The regeneration of mercury sludge formed in phosphoric acid or sulfo acid solution takes place in the same way. Part of the impurities contained in the sludge is burned by the current while the remainder is suspended in the lye which may be separated from it from time to time by decantation and may be used again. At the cathode some mercury amalgam separates out.

The degree of concentrating the caustic soda and potash solution may be varied, and so may the temperature.

Further experiments have shown that the exhausted mercury catalysts can be regenerated also by treating great quantities of such catalysts with acetylene in acid solution and at higher temperature. I have ascertained the interesting fact that mercury catalysts which have been almost exhausted in the normal process still show a satisfactory catalytic action provided that greater quantities are used, a great part of the mercury sludge being in this case reduced to liquid metal. Under certain conditions it is even possible to convert the whole of the sludge into liquid metal.

In regenerating the catalyst in an acid solution it is preferable not to use the catalysts in the normal process up to complete exhaustion, but to remove them as soon as their catalytic effect shows a visible diminution, in order to subject greater quantities thereof to the ultimate regenerating treatment.

In practising the invention on a commercial scale I prefer combining the two modifications of my regenerating method in such a way that the catalysts exhausted in the normal process is first treated in greater quantities and in acid solution with acetylene, thus transforming the greater part of the sludge into liquid metal, and the residual sludge is then regenerated in alkaline solution by the action of the electric current.

Example II: 300 parts of sludge obtained as above are treated at 60 to 90 degr. C. with acetylene in 500 parts of diluted acid such as a 3 to 5 per cent. sulfuric acid. The process is preferably carried out in the following manner: An excess of acetylene is introduced into the liquid which is stirred thereby, the aldehyde in excess is freed from aldehyde by washing and is introduced into the liquid afresh. The treatment with acetylene is carried on as long as a formation of aldehyde can be ascertained. By this treatment a considerable part of the sludge is converted into liquid metallic mercury.

Another considerable part of the sludge may be converted into liquid mercury by washing and drying. The regeneration of the remainder is preferably carried out by electrolysis in an alkaline solution as described in Example I.

I claim:

1. The method of regenerating mercury catalysts which are transformed into sludge by a catalytic process which comprises transforming the sludge into metallic mercury by electrolysis in an alkaline solution.

2. The method of regenerating mercury catalysts which consists in first subjecting great quantities of the exhausted catalysts to a treatment with acetylene in an acid solution to convert the greater part of them into metallic mercury, and transforming the remainder into metallic mercury by electrolysis in an alkaline solution.

3. The method of regenerating mercury catalysts which consists in first subjecting great quantities of the partially exhausted catalysts to treatment with acetylene in an acid solution to convert the greater part of them into metallic mercury, and transforming the remainder into metallic mercury by electrolysis in an alkaline solution.

In testimony whereof I have signed my name to this specification in the presence of two subscribing witnesses.

NATHAN GRÜNSTEIN.

Witnesses:
 CARL GRUND,
 ERNEST L. IVES.